(No Model.)

M. D. AHEARN.
METHOD OF PATCHING SAWS.

No. 602,293. Patented Apr. 12, 1898.

WITNESSES:
M. D. Bloudel
Edw. W. Byrn

INVENTOR
Michael D. Ahearn
BY Munn & Co.
ATTORNEYS.

UNITED STATES PATENT OFFICE.

MICHAEL D. AHEARN, OF GREEN BAY, WISCONSIN.

METHOD OF PATCHING SAWS.

SPECIFICATION forming part of Letters Patent No. 602,293, dated April 12, 1898.

Application filed July 8, 1897. Serial No. 643,893. (No specimens.)

*To all whom it may concern:*

Be it known that I, MICHAEL D. AHEARN, of Green Bay, in the county of Brown and State of Wisconsin, have invented a new and useful Improvement in Methods of Patching Saws, of which the following is a specification.

The object of my invention is to provide an improved method by which broken, cracked, or fractured mill and other saws or steel plates of similar construction may be repaired and made as good as new or by which saw-teeth may be inserted which by accident may have been broken out. It is known that mill-saws of every description frequently become fractured or cracked or teeth broken from various causes. Heretofore circular saws when fractured or cracked in the least became useless and had to be discarded. Band-saws could be repaired, but only by cutting the saw in two and splicing and brazing, making the saw shorter at every cut, and as these fractures occur quite often it soon leaves the saw in condition to make it unsafe to run and it finally has to be discarded.

My invention is intended to mend a fracture without cutting a saw in two and to arrest and mend a fracture in a circular saw so it may be used the same as if there had been no fracture. Teeth which have been inserted are generally not satisfactory, as they are liable to start another fracture in the saw.

My invention is designed to overcome all these difficulties; and to this end it consists in the peculiar method which I will now proceed to describe, reference being had to the accompanying drawings, in which—

Figure 1:
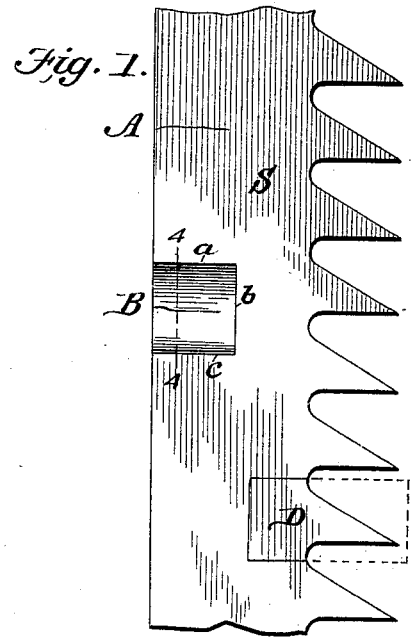
Figure 2:
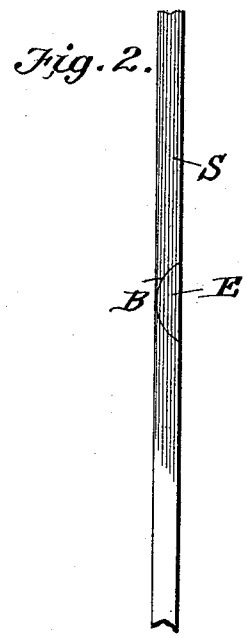
Figure 3:
Figure 4:
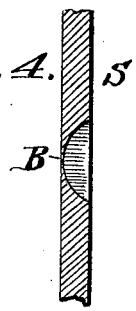
Figure 5:
Figure 6:
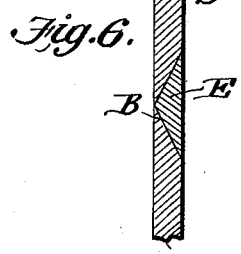

Figure 1 is a side view of a section of a band-saw, showing cracks in the process of being mended and also an inserted tooth. Fig. 2 is a back edge view of the saw after it has been mended. Figs. 3 and 5 are side and cross-sectional views of the inserted or inlaid splice-section, and Fig. 4 is a section through line 4 4 of Fig. 1 before the splice-section has been put in place. Fig. 6 is a cross-section showing a modification.

Referring to the drawings, S represents a part of a band-saw, in which in Fig. 1 there is shown at A a crack. The first operation in mending such a crack in accordance with my invention is to cut or grind out the side of the saw at its edge directly across the crack, as at B in Figs. 1 and 4, to form a recess. Then a splice-piece of steel E, Figs. 3 and 5, is prepared with a surface corresponding accurately to the contour of the ground or cut face at B. This splice-piece is to form a lap-joint across the crack, whose edges by grinding or cutting have been reduced to a feather's edge. Spelter and flux is then placed between the surface of the concave recess, and the inlaid splice-piece E and the two faces are then brazed solidly together, as shown in Fig. 2. This method acts in several ways to produce a strong and permanent patch. In the first place the crack itself has its edges so cut away to a feather's edge that it does not have any tendency to creep to a greater depth. In the second place there is formed a very extensive superficial area of recess by the lateral grinding or milling, so that there is a large surface afforded for the brazed contact, and, furthermore, the inserted pieces being united with the saw-plate at the three lines $a$ $b$ $c$ the line of union of the inserted piece does not coincide with the crack, and this makes a very strong and stable patch. Band-saws repaired in this way are not shortened in length, and their longevity and efficiency may be greatly extended.

Instead of repairing cracks saw-teeth may be replaced in precisely the same manner, as shown at D in Fig. 1.

In practice I prefer to make the recess B a concave one, as seen in Fig. 4; but this recess may be made angular or V-shaped, as shown in Fig. 6. This form gives about the same practical advantages, but the curved recess is more conveniently formed. In either case the sides of the recess are oblique or diagonal to the sides of the plate.

The recess B may be formed by any tool, file, emery-wheel, or bur; but for the purpose of quickly and conveniently forming said recess I have devised a special machine, which is shown and described in another application for a patent filed by me of even date herewith, Serial No. 643,792.

Having thus described my invention, what I claim as new, and desire to secure by Letters Patent, is—

The method of repairing fractures in metal plates, consisting in cutting away the metal of the plate on one side of the same directly across the line of the fracture to form a lateral recess and reduce the edges of the fracture to a feather's edge, then inlaying and brazing a corresponding splice-piece within this recess and across the fracture, substantially as and for the purpose described.

MICHAEL D. AHEARN.

Witnesses:
WM. HOOD,
C. E. SHULTZ.